Figure 1:
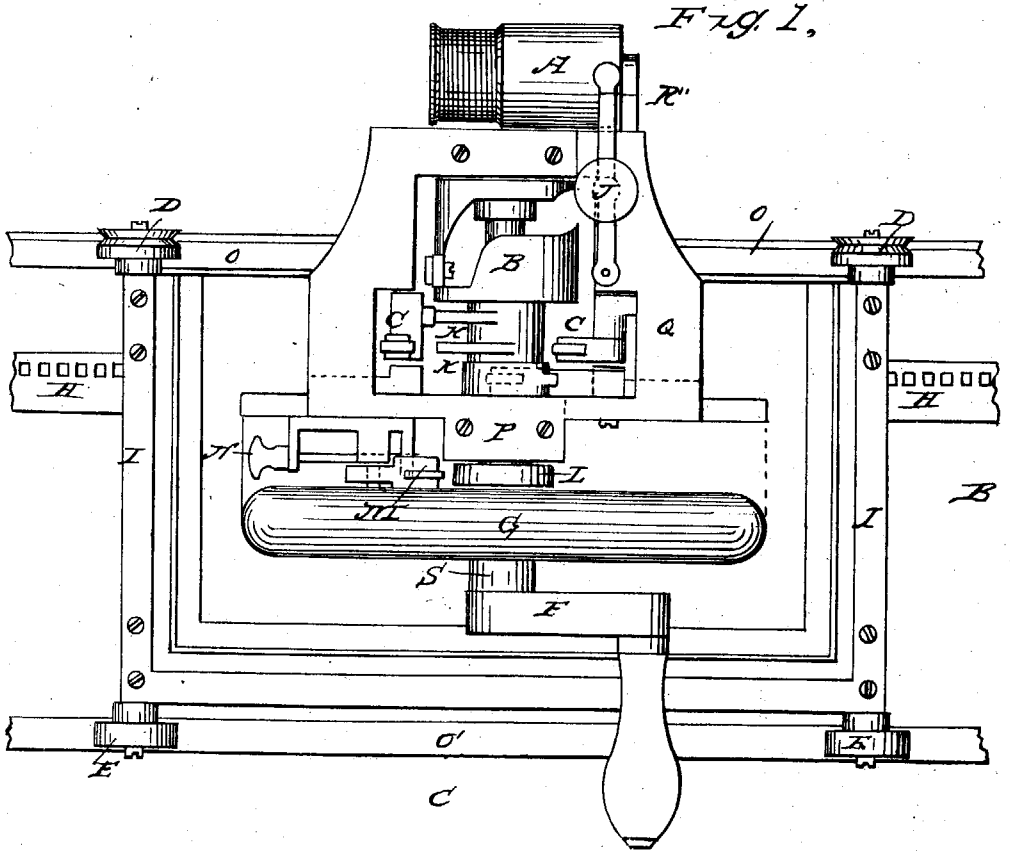

4 Sheets—Sheet 1.

J. A. BRADSHAW.

Sewing Machine.

No. 452.

Reissued April 14, 1857.

N. PETERS. Photo-Lithographer. Washington, D. C.

4 Sheets—Sheet 2.
J. A. BRADSHAW.
Sewing Machine.
No. 452. Reissued April 14, 1857.
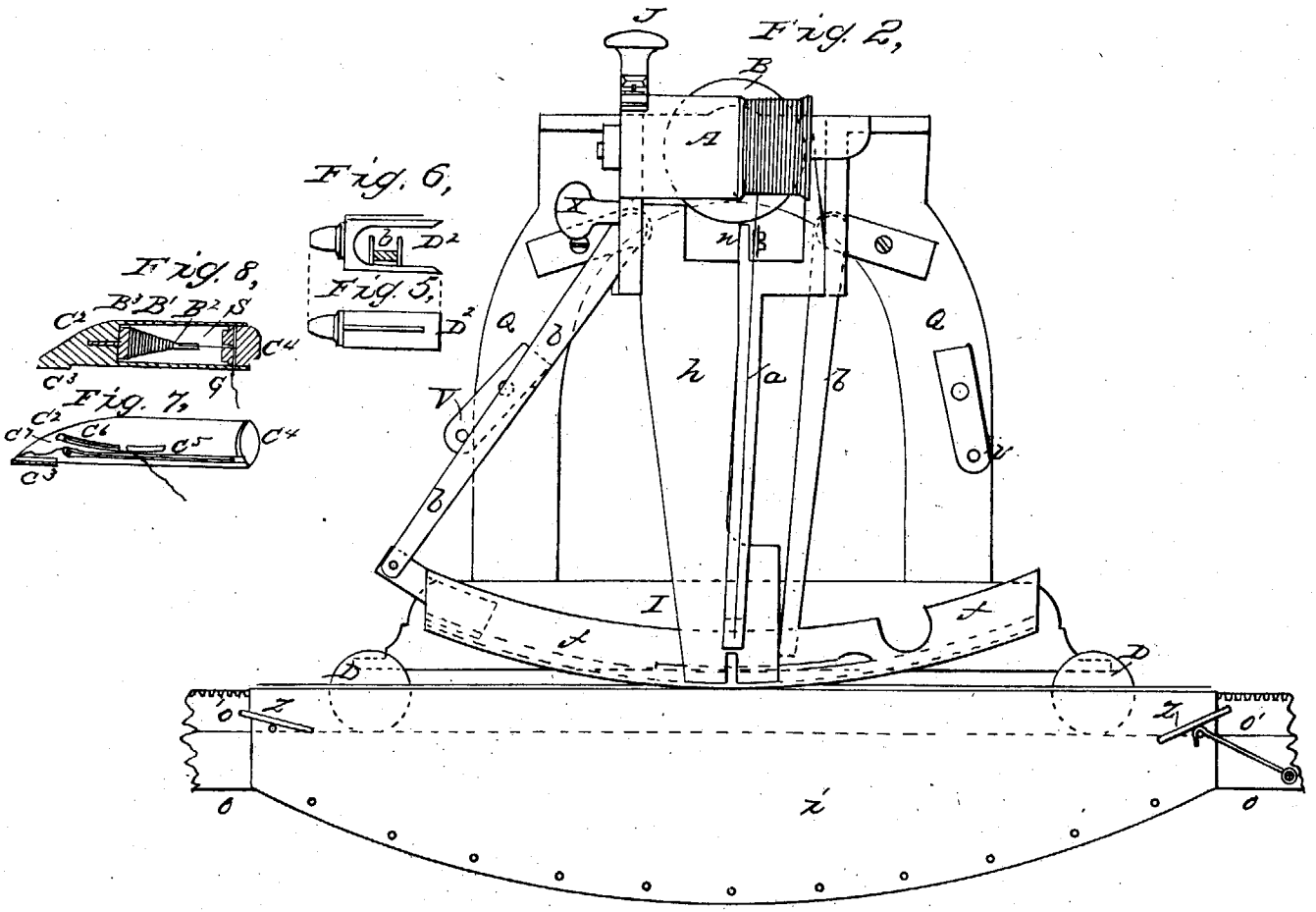
N. PETERS, Photo-Lithographer, Washington, D. C.

4 Sheets—Sheet 3.
J. A. BRADSHAW.
Sewing Machine.
No. 452. Reissued April 14, 1857.
Fig. 3,
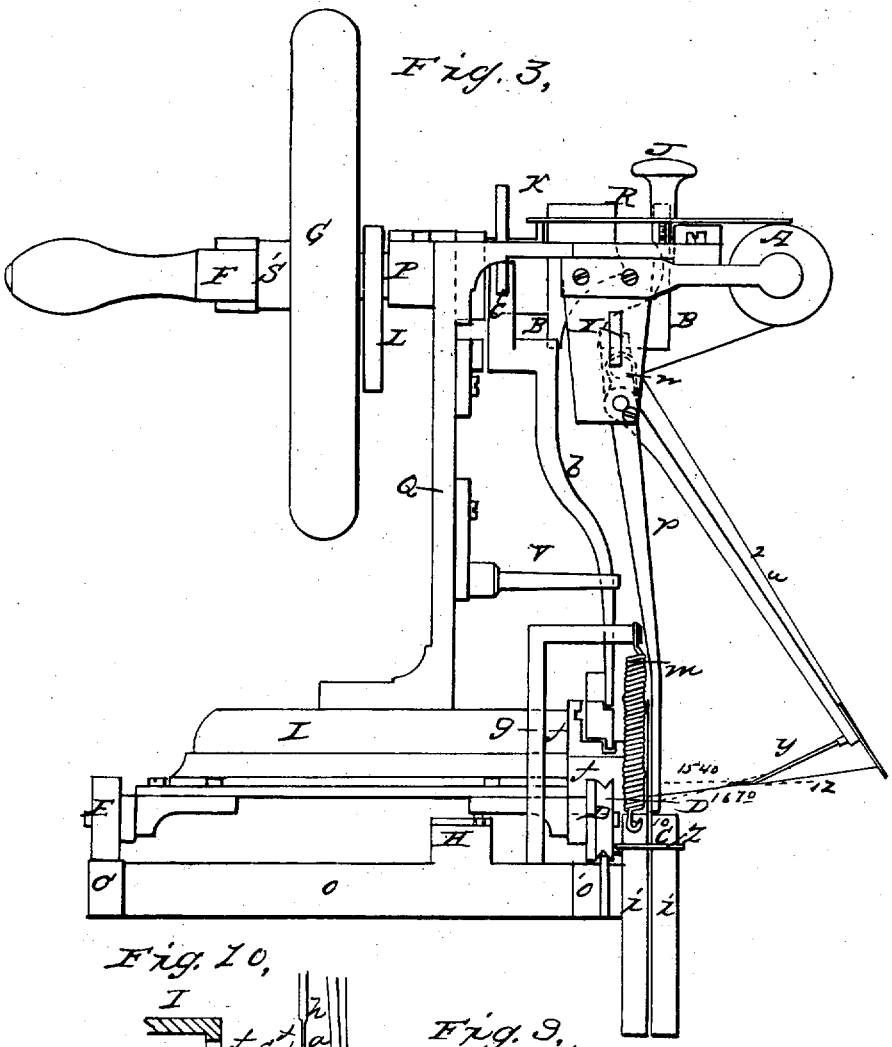
Fig. 10,
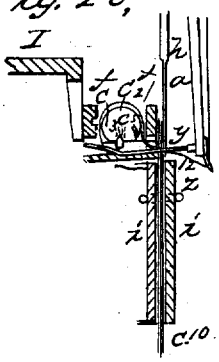
Fig. 9,
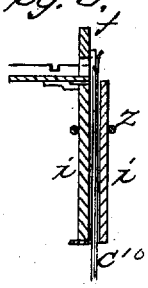
N. PETERS, Photo-Lithographer, Washington, D. C.

4 Sheets—Sheet 4.
J. A. BRADSHAW.
Sewing Machine.
No. 452.
Reissued April 14, 1857.
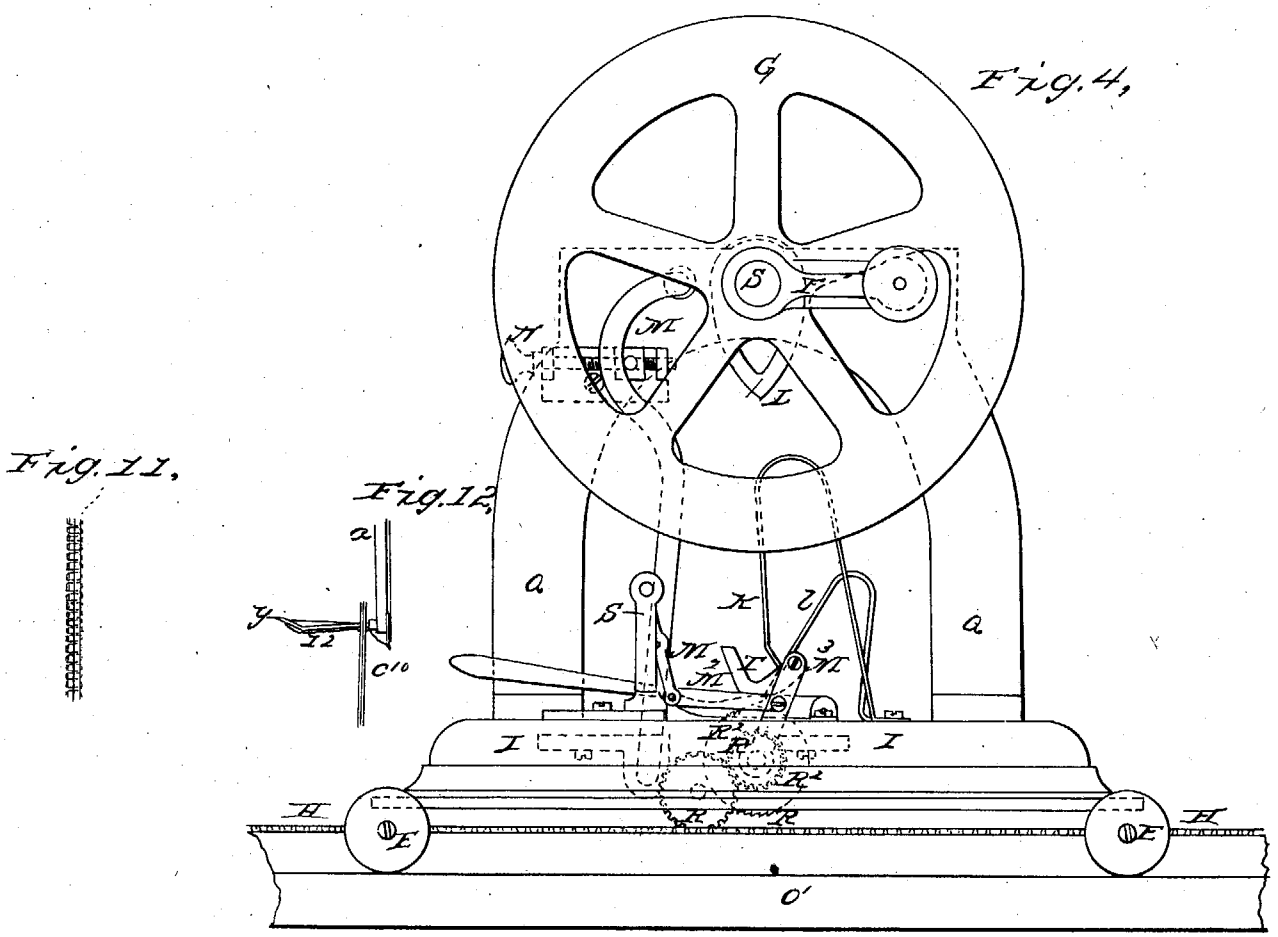
N. PETERS. Photo-Lithographer, Washington, D. C.

UNITED STATES PATENT OFFICE.

JOSEPH P. MARTIN, OF PHILADELPHIA, PENNSYLVANIA, ASSIGNEE OF JOHN A. BRADSHAW, OF LOWELL, MASSACHUSETTS.

IMPROVEMENT IN SEWING-MACHINES.

Specification forming part of Letters Patent No. 5,942, dated November 28, 1848; Reissue No. 452, dated April 14, 1857.

*To all whom it may concern:*

Be it known that JOHN A. BRADSHAW, of the town of Lowell, in the county of Middlesex and State of Massachusetts, has invented certain new and useful Improvements in the Machine for Sewing Seams in Cloth and other Substances; and I do hereby declare that the following is a full, clear, and exact description of the construction and operation of the same, reference being had to the annexed drawings, making a part of this specification, in which—

Figure 1 is a top view of the machine. Fig. 2 is an elevation of the front or side A, Fig. 1. Fig. 3 is an elevation of the end B, Fig. 1. Fig. 4 is an elevation of the back or side C, Fig. 1. Fig. 5 is a plan of the driver. Fig. 6 is a section of the driver. Fig. 7 is a perspective view of the bobbin-case. Fig. 8 is a vertical longitudinal section of the bobbin-case and the helical spring and perforated rubber plate, showing the manner in which the thread is wound upon the bobbin and how it passes through between the perforated rubber and the plug to the outside of the case. Fig. 9 is a section of the clamp for holding the cloth, showing the manner of suspending it to the box. Fig. 10 is a section showing the flying bobbin-case in the act of passing through the loop of the first thread at the moment after the needle has been drawn back slightly to form the loop. Fig. 11 shows the manner of forming the loop of the seam. Fig. 12 represents the needle passed through the cloth with the thread to form a stitch.

The letters of reference indicate the same parts in the different figures wherever they occur.

The following is a description of the construction and operation of the machine:

The platform O, on which the carriage is placed, and to which the clamp *i* is attached, the carriage I, with its frame-work to support the operative portion of the machine, the cam-shaft S′, with the cams B K L, &c., the balance-wheel G, the picker-staves *b b* and drivers $D^2$, the needle-arm *a*, the system of compound straight and bent levers M, &c., with the click T, ratchet-wheel $R^2$, cogged pinions R R′, and rack H, by the operation of which the carriage is moved simultaneously with the formation of the seam, are all constructed and operated in a manner substantially the same as the corresponding parts of the machine described in Elias Howe, Jr.'s, patent of September 10, 1846. A particular description of them is therefore unnecessary, and I shall merely refer to them in describing the improvements.

O is the base or platform, having a rack, H, running longitudinally along its upper surface parallel to the guides or ways O′, on which the carriage moves.

I is the carriage upon which the standards Q Q are erected, which support the cam-shaft S′, with its cam B, which operates the needle-arm *a*, and cams K K, that move the vibrating picker staves or arms *b b*, and the cam L, which operates the bent lever M, and with it the system of compound levers M′ $M^2$ $M^3$, connected together by joint-pins, which, by means of a dog, T, turn the ratchet-wheel $R^2$ and the cog-wheel R′, which is secured to the ratchet-wheel shaft, and which gears into the cog-wheel R, which meshes into the rack H. These wheels, operated by the aforesaid levers and cam, move the carriage along upon the ways O′ every time the needle is withdrawn from the cloth a distance equal to the length that the next stitch is required to be made. The cloth being held between the clamp-boards, and these being attached to the way O′, which is stationary, remains in the same position, while the machine carrying the needle and thread moves along by the side of the seam as fast as it is formed. The length of the stitch is varied by turning the thumb-screw N, which brings the lever M more or less within the scope of the action of the cam L, which moves it as in the Howe machine.

The needle (which constitutes one of the improvements) is of the form seen at *y*, and is attached to the vibrating lever *a*, by which in the formation of each stitch it is caused to pierce and protrude through the cloth, carrying with it the bend or loop of the first thread. The needle has two angular bends, as represented. Through the angle nearest to the point the eye is made, through which, from the under side, the thread from the bobbin A is passed, as represented by the line 12, and from thence to the cloth. The needle is made of this shape, in order that while it is passing through the cloth a loop or space for the bobbin-case to pass through may be formed between the thread, which passes in a straight line from the eye back to the cloth $c^{10}$, where the stitch is being formed, as represented in Fig. 12, the thread forming the base or longest side of an obtuse-angled triangle when extended or stretched by the entrance of the needle the full extent to which it is designed to enter, said portion of the thread being made to bow upward and form a loop directly in the path of the bobbin-case, the needle being withdrawn a short distance and then stopped for an instant of time, that the bobbin-case may be passed through the loop, its beak or pointed end entering said loop without obstruction, passing between the needle and the thread, drawing out the slack of the latter to form the loop large enough, that it may pass through with facility, which gives out the second thread which is to be drawn into the cloth by the said loop of the first thread on the withdrawal of the needle from the cloth, as seen in Fig. 10. Every time the needle pierces the cloth the vibrating clamp *h* is made to press the cloth firmly against the side of the curved trough or segment-box until after the needle is again withdrawn. This prevents any movement of the cloth during the formation of the stitch.

The portion of the needle from the arm *a* to the first angle is made straight. From thence it is bent upward, forming angle of about one hundred and fifty-four degrees with the first-named portion. It is then bent downward at the point, forming an angle of about one hundred and sixty-seven degrees with the middle or last-named portion. This shape of needle, when operated in the manner above described, will form the loop in the transverse thread without the use of the lifting-pin used in the Howe machine.

The case of the flying bobbin is made of any suitable metal and of convenient dimensions. The exterior form of the body of the case is that of segment of a cylinder larger than a half-cylinder in its transverse section, while its interior is cylindrical. The bobbin-cases heretofore used had openings at the top, which caused the loop to bear upon edges when the shuttle passed through it, thus materially increasing the wear of the thread, causing it frequently to break. The improvement in the form of the exterior of the case entirely obviates the objections made to the others in that particular by presenting to the loop a smooth cylindrical surface—that is to say, a surface presenting no edges transversely to that portion of the loop which bears upon it during its passage. The beak or front end of the case is semi-conical in shape and solid, having a tongue, $C^3$, upon its under side corresponding to the groove in the bottom of the guide-trough or segment-box *f* in which it runs. Within the case is the bobbin which holds the second thread. The tension of the bobbin-thread is regulated by various appliances within, upon, or forming part of the case itself.

The stitches are formed, as in the Howe machine, by the thread from the bobbin-case $C^2$ being looped around the thread of the needle and drawn together with a tension corresponding to the force with which the appliances before mentioned act upon the thread. The manner in which the threads are looped together in the seam will appear more plainly by reference to Fig. 11, in which the dotted line represents the loops made by the first thread and the black line those made by the second. The cloth or other material to be sewed is held in the clamp before described.

Having thus fully described the machine and its operation, what is claimed as new, and which I desire to secure by Letters Patent, is—

The covered shuttle to be used in a sewing-ing-machine, or, in other words, constructing that portion of the bobbin-case which comes in contact with the loop cylindrical or in any form which does not present edges in its transverse sections.

In testimony whereof I have signed my name to this specification this 26th day of January, 1857.

JOSEPH P. MARTIN,
*Assignee of John A. Bradshaw.*

In presence of—
JNO. B. KENNEY,
CHARLES THOMPSON.